Figure 1A:
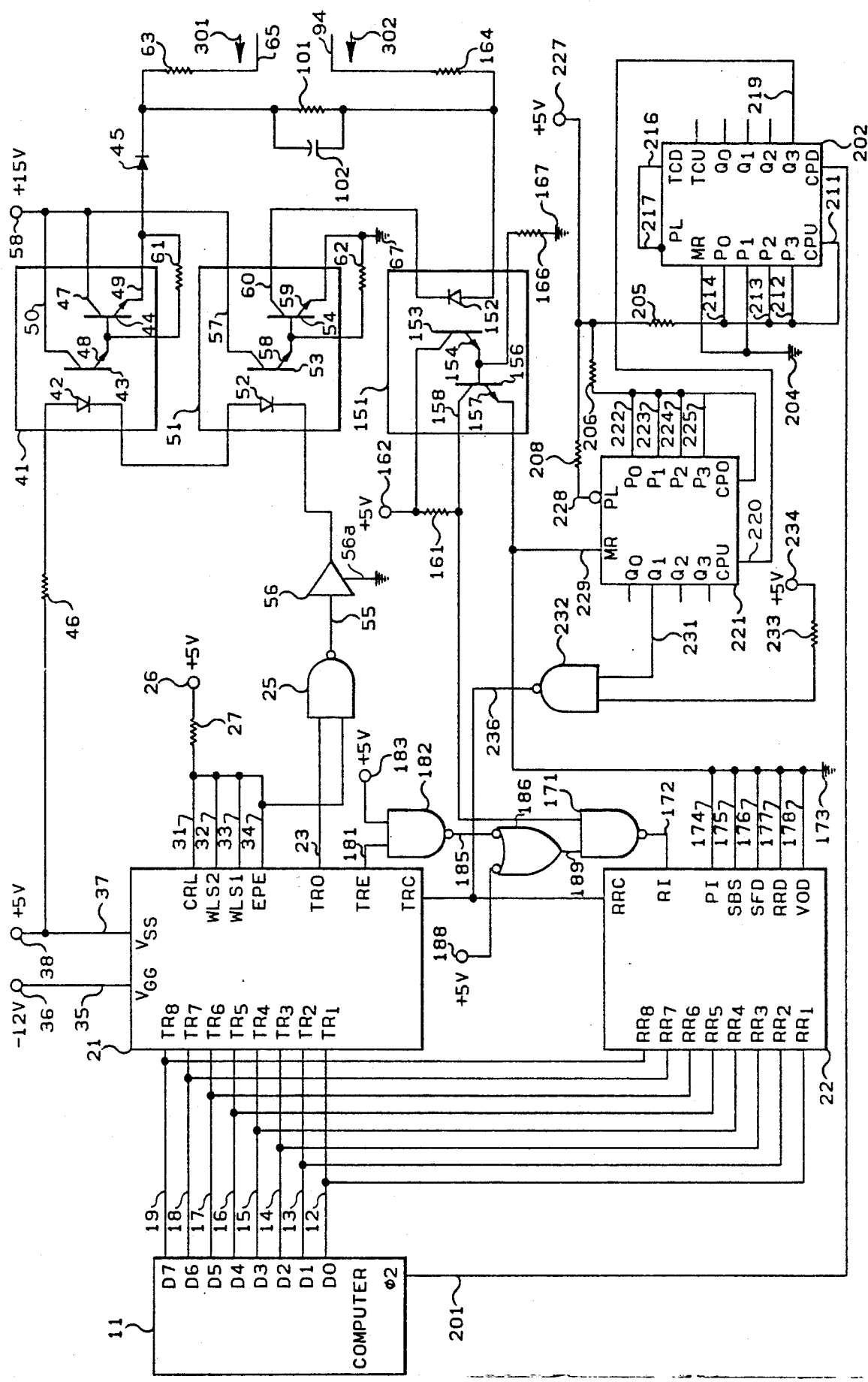

United States

Farmer

4,178,504

Dec. 11, 1979

[54] BALANCED TERMINATION FOR A TRANSMISSION LINE

[75] Inventor: Robert L. Farmer, Bartlesville, Okla.

[73] Assignee: Phillips Petroleum Company, Bartlesville, Okla.

[21] Appl. No.: 870,545

[22] Filed: Jan. 18, 1978

[51] Int. Cl.² ............................................. H04B 9/00
[52] U.S. Cl. ................................. 250/199; 178/58 A; 250/551
[58] Field of Search ............. 250/199, 551; 178/58 A, 178/58 R, 68; 340/189, 190; 307/361

[56] References Cited

U.S. PATENT DOCUMENTS

| | | | |
|---|---|---|---|
| 3,497,619 | 2/1970 | Babcock | 178/68 |
| 3,725,582 | 4/1973 | Davis | 178/58 R |
| 3,843,834 | 10/1974 | Burke | 178/58 A |
| 3,975,712 | 8/1976 | Hepworth et al. | 340/147 R |
| 4,024,501 | 5/1977 | Herring et al. | 178/58 A |
| 4,052,702 | 10/1977 | Smith et al. | 364/200 |

OTHER PUBLICATIONS

Peatman-Microcomputer Based Design-McGraw Hill, 1977, pp. 331, 332, 288-299, 214-219, 272-273.

Soucek et al.-Microprocessors and Microcomputers-John Wiley & Sons, Inc. 1976, pp. 212-214.

Primary Examiner—Robert L. Richardson
Assistant Examiner—Joseph A. Orsino, Jr.

[57] ABSTRACT

Balancing of a "transmit" line and a "receive" line, which make up a half-duplex serial transmission line, is accomplished, where a first optical isolator is utilized to drive an electrical current signal over the "transmit" line and a second optical isolator is utilized to receive electrical current signals from the "receive" line, by adding a third optical isolator to the circuit. The third optical isolator is in an on condition when the first optical isolator is in an on condition and is in an off condition when the first optical isolator is in an off condition. The third optical isolator is used to make the "receive" and "transmit" lines both see a "signal ground", at the ends thereof connected to the first and second optical isolators, when current is flowing in the "transmit" line. The third optical isolator is used to make the "receive" and "transmit" lines both see the same resistive element, at the ends thereof connected to the first and second optical isolators, when no current is flowing in the "transmit" line. In this manner, a balanced transmission line is insured under all circumstances.

9 Claims, 2 Drawing Figures

BALANCED TERMINATION FOR A TRANSMISSION LINE

This invention relates to method and apparatus for terminating a transmission line. In a particular aspect, this invention relates to method and apparatus for balancing a half-duplex serial transmission line.

It is often desirable to transmit information, as serial data, over considerable distances in an electrically noisy environment. An example of this is where a central computer facility is utilized to control remote functions in a manufacturing or processing plant. Another example would be the transmission of data between a central computer and a remote computer in a manufacturing or processing plant or other facility. Problems may occur if the transmission line, made up of a "transmit" line and a "receive" line, used to transmit the information is not properly terminated so as to be balanced. If the transmission line is not balanced, noise or other interference may be injected onto the transmission line, causing an error in the information transmitted.

A simple solution to the problem of proper transmission line termination is to use shielded cable. Shielded cable eliminates the possibility of noise or other interference being injected on the transmission line, thus eliminating the problem of balancing the transmission line. However, the disadvantage with shielded cable is the cost which may greatly increase the expense of installing a system using a transmission line.

Because of the expense of shielded cables, unshielded, two-wire, twisted pair cables are often used for transmission lines. However, noise or other interference can be injected onto such cables, thus making it necessary to balance the two wires. Balancing of transmission lines eliminates the possibility that noise or other interference can be injected onto the transmission lines and thus eliminates the possibility of errors in the information caused by outside interference.

Optical isolators are often used to drive an electrical current signal over the "transmit" wire of a transmission line. In the past, it has been common to terminate the "receive" line through a second optical isolator, into a resistive element. With the transmission line terminated in this manner, the line will be balanced when the transistor output stages of the driving optical isolator are on and no errors will be present from outside interference. However, when the transistor output stages of the driving optical isolator turn off, the transmission line will go unbalanced, allowing noise or interference to cause errors in the data being transmitted. A resistive termination reduces the possibility of errors but does not eliminate the possibility because the transmission line will be unbalanced at least a part of the time.

Accordingly, it is an object of this invention to provide method and apparatus for terminating a transmission line. Another object of this invention is to provide method and apparatus for balancing a serial transmission line.

In accordance with the present invention, method and apparatus is provided whereby a first optical isolator is used to drive an electrical current signal over a "transmit" line of a serial transmission line. The "receive" line which makes up the other half of the transmission line is terminated, through a second optical isolator, into a third optical isolator instead of a resistive element. The third optical isolator is in an on condition when the first optical isolator is in an on condition and is in an off condition when the first optical isolator is in an off condition. This allows the transmission line to be balanced both when the first driving optical isolator is off and when it is on. Errors due to outside interference will be eliminated even when the driving optical isolator is off.

Figure 1B:
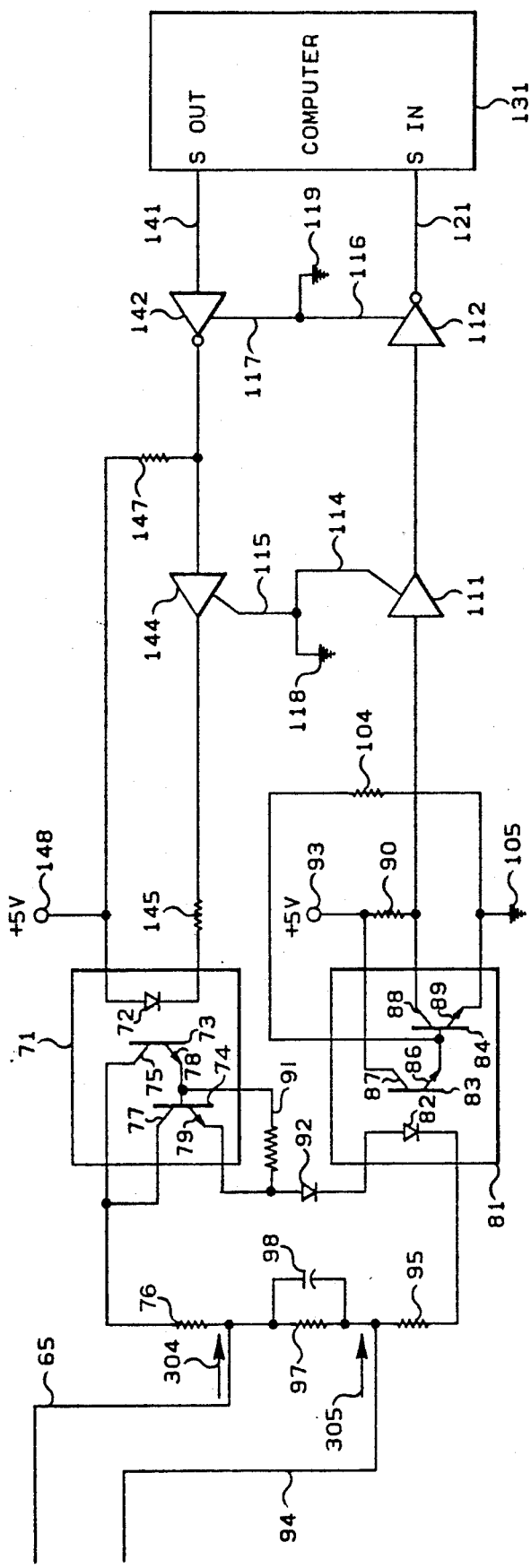

Other objects and advantages of the invention will be apparent from the description of the invention and the appended claims, as well as from the detailed description of the drawings in which FIG. 1a and FIG. 1b represent an electrical schematic of the interface between two microprocessors where a two-wire balanced line is used to transmit information between the two microprocessors. The half-duplex, serial transmission line provides the common interface between FIG. 1a and FIG. 1b.

The preferred embodiment of this invention is described in terms of an interface between two microprocessors. However, the invention is not limited to communications between two computers but is applicable to any application where a balanced transmission line is desirable.

For the sake of convenience and in an effort to clearly describe the invention, the half-duplex serial transmission line used in the preferred embodiment of the invention is described as having a "transmit" line and a "receive" line. In the art such transmission lines are normally described only as one line because current flows in both lines at the same time. It is only for the sake of clarity of the "transmit" line and the "receive" line are described as separate entities.

Referring now to the drawing, the computer means 11 transmits data to the Universal Asynchronous Transmitter (UAT) and receives data from the Universal Asynchronous Receiver (UAR) over the bidirectional data lines 12–19. In the preferred embodiment of the invention, the computer means 11 is a Motorola 6800 Microprocessor. The Universal Asynchronous Transmitter (UAT) 21 and the Universal Asynchronous Receiver (UAR) 22 both made up the TR1402A Asynchronous Receiver/Transmitter (UART) manufactured by Western Digital Corporation.

The UAT 21 converts the parallel data transmitted from computer means 11, over the bidirectional data lines 12–19, to serial data. The serial data is output from the TRO pin of the UAT 21 which is shown as line 23. The serial data from the UAT 21 is supplied to one input of NAND gate 25. The second input of NAND gate 25 is tied through resistor 27 to the +5 V power supply 26. The control-register-load pin 31, the word-length-select pins 32 and 33, and the even-parity-enable pin 34 of the UAT 21 are also tied through resistor 27 to the +5 V power supply 26. The $V_{GG}$ pin of the UAT 21 is tied to the −12 V power supply 36. The $V_{ss}$ pin 37 of the UAT 21 is tied to the −5 V power supply 38.

The optical isolator 41 is made up of the light emitting diode 42, phototransistor 43 and transistor 44. In like manner, the optical isolator 51 is made up of the light emitting diode 52, phototransistor 53 and transistor 54. The anode side of the light emitting diode 42 is tied resistor 46 to the +5 V power supply 38. The cathode side of the light emitting diode 42 is tied to the anode side of the light emitting diode 52. The output signal 55 from the NAND gate 25 is supplied through the tri-state buffer 56 to the cathode side of the light emitting diode 52. The enabling input 56a of the tri-state buffer 56 is tied to ground so the tri-state buffer 56 will always be in a conducting state. The collector 50 of phototransistor 43, the collector 47 of transistor 44, and the collector 57 of phototransistor 53 are all tied to the +15 V power supply 58. The emitter 48 of the phototransistor 43 is tied to the base of transistor 44 and is tied through resistor 61 to the emitter 49 of transistor 44. The output signal from the emitter 49 of transistor 44, which will be an electrical current signal, is supplied through a resistor 63 and current limiting diode 45 to the "transmit" line 65 which makes up one-half of a half-duplex, serial transmission line. The emitter 58 of phototransistor 53 is tied to the base of transistor 54 and is also tied through resistor 62 to the ground 67. The emitter 59 of the transistor 54 is also tied to the ground 67.

The optical isolator 71 is made up to the light emitting diode 72, phototransistor 73 and transistor 74. Likewise, the optical isolator 81 is made up of the light emitting diode 82, phototransistor 83 and transistor 84. The output signal from the emitter 49 of the transistor 44, which is the serial data signal, is carried over "transmit" line 65 and is supplied through resistor 76 to the collector 75 of phototransistor 73 and the collector 77 of transistor 74. The emitter 78 of phototransistor 73 is tied to the base of transistor 74. The emitter 79 of transistor 74 is tied through resistor 91 to the emitter 78 of phototransistor 73. The emitter 79 of transistor 74 is also tied through diode 92 to the anode side of the light emitting diode 82. The cathode side of the light emitting diode 82 is tied through resistor 95 to the "receive" line 94 which, together with the "transmit" line 65, makes up a half-duplex, serial transmission line. The "transmit" line 65 and the "receive" line 94 are tied together by resistor 97 and capacitor 98 which are in parallel. The "transmit" line 65 and the "receive" line 94 are also tied together by resistor 101 and capacitor 102 which are also in parallel. The collector 87 of the phototransistor 83 is tied to the +5 V power supply 93 and is also tied through resistor 90 to the collector 88 of transistor 84. The collector 88 of transistor 84 is tied through resistor 90 to the +5 V power supply 93 and to the collector 87 of phototransistor 83. The emitter 86 of phototransistor 83 is tied to the base of transistor 84. The emitter 89 of transistor 84 is tied to ground 105 and is also tied through resistor 104 to the emitter 86 of phototransistor 83. The output signal from the collector 88 of transistor 84 is supplied through tri-state buffer 111 and inverter 112 to the serial input of computer means 131. The output signal from the collector 88 of transistor 84, which is shown as signal 121 entering the serial input of the computer means 131, is representative of the parallel data that was transmitted from computer means 11 over the bidirectional data lines 12-19. The enabling line 114 of the tristate buffer 111 is tied to ground 118. The enabling line 116 of the tri-state inverter 112 is tied to ground 119.

Computer means 131 is, in this preferred embodiment, a SC/MP Microprocessor manufactured by National Semiconductor Corporation. Data is transmitted from the SC/MP Microprocessor 131 over data line 141. The data line 141 is tied through tri-state inverter 142, tri-state buffer 144 and resistor 145 to the cathode side of the light emitting diode 72. The data terminal 141 is also tied through tri-state inverter 142 and resistor 147 to the +5 V power supply 148 and to the anode side of the light emitting diode 72 which is also tied to the +5 V power supply 148. The enabling line 115 of the tri-state buffer 144 is tied to ground 118. The enabling line 117 of the tri-state inverter 142 is tied to ground 119.

The optical isolator 151 is made up of the light emitting diode 152, phototransistor 153 and the transistor 156. The "receive" line 94 is tied through resistor 164 to the anode side of the light emitting diode 152. The cathode side of the light emitting diode 152 is tied to the collector 60 of transistor 54. The collector 155 of phototransistor 153 is tied to the +5 V power supply 162 and is also tied to the collector 158 of transistor 156 through resistor 161. The emitter 154 of phototransistor 153 is tied to ground 167 through resistor 166 and is also tied to the base of transistor 156. The collector 158 of transistor 156 is tied through resistor 161 to the collector 155 of phototransistor 153 and to the +5 V power supply 162. The output signal from the collector 158 of transistor 156 is also supplied to one input of NAND gate 171. The emitter 157 of transistor 156 is tied to ground 173.

The transmitter register-empty pin 181 of the UAT 21 is tied to one input of NAND gate 182. The second input of NAND gate 182 is tied to the +5 V power supply 183. The output signal 185 from NAND gate 182 is supplied to one inverted input of the OR gate 186. The second inverted input of the OR gate 186 is tied to the +5 V power supply 188. The output signal 189 from the OR gate 186 is supplied to the second input of the NAND gate 171. The output signal 172 from the NAND gate 171 is supplied to the receiver-input pin of the UAR 22. The parity-inhibit pin 174, the stop-bit-selected pin 175, the statusflag-disconnect pin 176, the receiver-register-disconnect 177, and the power supply ground pin 178 of the UAR 22 are all tied to ground 173. Data is supplied to computer means 11 from the UAR 22 over the bidirectional data lines 12-19 from the outputs of the UAR 22 labelled $RR_1$-$RR_8$.

The output signal 201 from computer means 11, which is the $\phi 2$ output from the Motorola 6800 Microprocessor, is utilized to supply the 19.2 KHz clock signal required by the UAT 21 and the UAR 22. Signal 201 is supplied to the countdown input of counter 202 which, in this preferred embodiment, is an asynchronous up/down counter, 74 LS193, manufactured by National Semiconductor. The data input pins 212-214 and the countup pin 211 of the counter 202 are tied through resistor 205 to the +5 V power supply 227. The borrow output pin 216 and the load input pin 217 of the counter 202 are tied together. The output pin 219 of the counter 202 is supplied to the countup input of the counter 221. The counter 202, configured as shown, acts as a divide by 13 and thus the $\phi 2$ signal 201 from computer means 11, which is a 1 MHz signal, is divided by 13 and is supplied from the output pin 219 of counter 202 to the countup pin 220 of counter 221.

In this preferred embodiment, counter 221 is an asynchronous up/down counter, 9LS193, manufactured by Fairchild Semiconductor. The input-data pins 222-225 and the countdown pin 226 of the counter 221 are all tied through resistor 206 to the +5 V power supply 227. The inverter load-input pin 228 of counter 221 is tied through resistor 208 to the +5 V power supply 227. The clear-input pin 229 of the counter 221 is tied to ground 173. The data-output pin 231, which is shown as output $Q_1$ of counter 221, is tied to one input of NAND gate 232. The second input of NAND gate 232 is tied to the +5 V power supply 234 through resistor 233. The output signal 236 from the NAND gate 232 is supplied as a clock signal to both the TRC clock input of UAT 21 and the RRC clock input of UAR 22. The counter 221, configured as shown, acts as a divide by 4. Thus, the output signal from pin 231 has a frequency of 19.2 kHz and the output signal 236 from NAND gate 232 will also have a frequency of 19.2 kHz which is the clock frequency required by the UAT 21 and the UAR 22.

Data is supplied in parallel form from computer means 11 to the UAT 21. The UAT converts the data to serial form and the data is output from the serial data output pin 23 of the UAT 21. In this preferred embodiment, a positive voltage (high) at the output pin 23 corresponds to a binary "1" and a 0 voltage (low) at the output pin 23 corresponds to a binary "0". If the signal appearing at the output pin 23 of the UAT 21 is high, the output signal from the NAND gate 25 will go low; thus the output of the tri-state buffer 56 (a current sink) goes low. This allows current to flow from the +5 V power supply 38 through the light emitting diodes 42 and 52. If the output signal 23 from the UAT 21 has a 0 voltage level, the output signal 55 from NAND gate 25 will be high. The out-put of the tri-state buffer 56 will also be high and no current will flow through light emitting diodes 42 and 52. A current flow through light emitting diodes 42 and 52 causes light to be emitted and this light is sensed by the phototransistors 43 and 53 respectively. The phototransistor 43 and transistor 44 of optical isolator 41 and phototransistor 58 and transistor 54 of optical isolator 51 are thus turned on and current flows in the "transmit" line 65. If no current is flowing through the light emittng diodes 42 and 52, then no light will be sensed by phototransistor 43 and phototransistor 53 respectively. In this state, optical isolators 41 and 51 will be in an "off" condition and no current will flow in the "transmit" line 65. Thus a flow of electrical current in the "transmit" line 65 is representative of a binary "1" transmitted from the computer means 11. The lack of a flow of electrical current flow in the "transmit" line 65 is representative of a binary "0" transmitted by the computer means 11.

When the computer means 131 is receiving data, the output side of both tri-state inverter 142 and tri-state buffer 144 will be low. Thus, electrical current will flow through the light emitting diode 72 of optical isolator 71 from the +5 V power supply 148 through resistor 145 to tri-state buffer 144. This has the effect of turning both the phototransistor 73 and transistor 74 of the optical isolator 71 on. When the phototransistor 73 and transistor 74 are on, any signal appearing on the transmit line 65 is supplied through resistor 76, phototransistor 73, transistor 74, and diode 92 to the anode side of the light emitting diode 82. If current is flowing in the transmit line 65, then light will be emitted by the light emitting diode 82 and this light will be sensed by the phototransistor 83 of the optical isolator 81. When the phototransistor 83 and transistor 84 turn on, the collector 88 of transistor 84 goes low and a binary "0" voltage will appear at the input of the tri-state inverter 112. Thus, the output signal 121 from the tri-state inverter 112 will be high and will be representative of a binary "1" transmitted by computer means 11. If no current is flowing in the transmit line 65, then the light emitting diode 82 will be off and the phototransistor 83 and transistor 84 of the optical isolator 81 will be in an off condition. When the optical isolator 81 is in an off condition, collector 88 of transistor 84 and the input of tri-state buffer 111 will be high. Thus, the output signal 121 from the tri-state inverter 112 will be low and will correspond to a binary "0" transmitted by computer means 11. In this manner, the electrical current signals which appear on the "transmit" line 65 have been converted to electrical voltage signals which are compatible with the input requirements of the computer means 131.

Data is transmitted from computer means 131 over the serial data output line 141. In this preferred embodiment, a positive voltage (high) on the serial output line 141 corresponds to a binary "1" and a 0 output voltage (low) on the serial output line 141 will correspond to a binary "0". When the serial output line 141 of computer means 131 is high, the output of the tri-state inverter 142 will be low. The output of the tri-state buffer 144 will also be low and current will flow from the +5 V power supply 148 through the light emitting diode 72. This light will be sensed by the phototransistor 73 of the optical isolator 71 and the phototransistor 73 and transistor 74 will be turned on. When the phototransistor 73 and transistor 74 turn on, an electrical current signal will be supplied from the emitter 79 of transistor 74 through diode 92, light emitting diode 82, and resistor 95 to the receive line 94. Thus, a current flow on the "receive" line 94 corresponds to a binary "1" being transmitted by computer means 131.

If a binary "0" is being transmitted by computer means 131, then the serial output line 141 will be low and the output of the tri-state inverter 142 will be high, causing the output of tri-state buffer 144 to also be high. No current will flow from the +5 V power supply 148 through the light emitting current will flow from the +5 V power supply 148 through the light emitting diode 72 of optical isolator 71. With no current flow to the light emitting diode 72, the phototransistor 73 and transistor 74 of the optical isolator 71 will not turn on and no electrical signal will be present on the "receive" line 94. Thus, the absence of current flow on "receive" line 94 corresponds to a binary "0" being transmitted by computer means 131.

If current is flowing on the "receive" line 94, then current will flow through the light emitting diode 152 of the optical isolator 151. Light will be emitted from the light emitting diode 152 and this light will be sensed by the phototransistor 153, causing the phototransistor 153 and transistor 156 to turn on. When the transistor 156 is on, collector 158 of transistor 156 is at a binary "0" and the input of NAND gate 171 will be at a binary "0". Thus, the output signal 172 from the NAND gate 171 will be a binary "1" and will be supplied to the serial input, shown as input RI, of the UAR 22. A positive voltage appearing as the output signal 172 from NAND gate 171 corresponds to a binary "1" being transmitted by computer means 131.

When no current is flowing on the "receive" line 94 corresponding to a binary "0" being transmitted by computer means 131, no current will flow through the light emitting diode 152 of optical isolator 151. When no current flows through the light emitting diode 152, both the phototransistor 153 and transistor 156 will be off. When the transistor 156 of the optical isolator 151 is off, collector 158 will be at a binary "1" and the input of the NAND gate 171 will be at a binary "1". This causes the output signal 172 from the NAND gate 171 to be at a binary "0". Thus, a binary "0" output signal 172 from the NAND gate 171 corresponds to a binary "0" being transmitted by computer means 131.

Data transmitted from computer means 131 is received at the serial line input of the UAR 22 via the output signal 172 from the NAND gate 171. This data, which is in serial format, is converted to parallel format by the UAR 22 and is transmitted then to be computer means 11, using the bidirectional data lines 12–19.

In this preferred embodiment of the invention, the transmission line is made up of a "transmit" line 65 and "receive" line 94. The "transmit" line 65 and the "receive" line 94 are both made up of one wire. These wires are twisted together but are not shielded. Thus, it is possible to inject noise or interference on the lines if the lines are not balanced. The transmission line may run for many hundreds of feet through a plant or factory and thus may be exposed to many sources which could cause noise or other interference to be injected on the transmission line. It is thus a necessity that the transmission line be balanced both when current is flowing in the line and when no current is flowing in the line.

The optical isolator 51 is used in the present invention to present a unique method of balancing a transmission line. When no current is flowing on the "transmit" line 65, the phototransistor 43 and the transistor 44 of optical isolator 41 and the phototransistor 53 and transistor 54 of optical isolator 51 will be in an "off" condition. When the transistors associated with the optical isolator 41 and optical isolator 51 are in an "off" condition, the impedance seen by the "transmit" line 65 when looking in the direction shown by arrow 301 would be dominated by the parallel combination of capacitor 102 and resistor 101. Thus, the transmission line, when looking in the direction of arrows 301 and 302, sees exactly the same impedance on the "transmit" line 65 and the "receive" line 94 when no current is flowing in the "transmit" line 65.

When current is flowing in the "transmit" line 65 the phototransistor 43 and transistor 44 associated with optical isolator 41 and the phototransistor 53 and the transistor 54 associated with optical isolator 51 will all be in an "on" condition. When the transistors associated with the optical isolator 41 and optical isolator 51 are in an "on" condition, the "transmit" line 65 will see effectively the signal ground of the power supply 58 when looking in the direction of arrow 301. In like manner, when the transistors associated with optical isolator 51 are in an "on" condition the "receive" line 94 will see the signal ground 67 which is at the same ground potential as the ground of power supply 58. Thus, the transmission line will be balanced when current is flowing on the "transmit" line 65 because the "transmit" line 65 and the "receive" line 94 will each see effectively the same impedance when looking in the directions of arrows 301 and 302.

When data is being transmitted from the computer means 11 to computer means 131, current is always flowing through light emitting diode 72 associated with optical isolator 71. Because of this, phototransistor 73 and transistor 74 are always in an "on" condition when data is being transmitted from computer means 11 to computer means 131. Thus, the "transmit" line 65 and the "receive" line 94 are effectively shorted together except for resistors 76 and 95, and the transmission line will always see the same impedance when looking in the direction of arrows 304 and 305 when data is being transmitted from computer means 11 to computer means 131.

When it is desired to transmit data from computer means 131 to computer means 11, current is always flowing through the light emitting diode 42, associated with optical isolator 41, and the light emitting diode 52, associated with optical isolator 51. Because of this, the phototransistor 43 and transistor 44, associated with optical isolator 41, are always in an "on" condition when data is being transmitted from computer means 131 to computer means 11. In like manner, the phototransistor 53 and transistor 54 associated with optical isolator are also always in an "on" condition when it is desired to transmit data from computer means 131 to computer means 11.

When current is flowing in the "receive" line 94, the phototransistor 73 and transistor 74, associated with optical isolator 71, will be in an "on" condition. Thus, the "receive" line 94 and the "transmit" line 65 will be effectively shorted together and the impedance seen by the "transmit" line when looking in the direction of arrow 304 will be identical to that seen by the "receive" line when looking in the direction of arrow 305. Thus, the transmission line will be balanced in the direction of arrows 304 and 305 when current is flowing in the "receive" line 94.

When no current is flowing in the "receive" line 94, the phototransistor 73 and the transistor 74, associated with optical isolator 71, will both be in an "off" condition. The effective impedance seen by the "transmit" line 65 when looking in the direction of arrow 304 will be determined by the resistor 97 and capacitor 98. The effective impedance seen by the "receive" line when looking in the direction of arrow 305 will also be determined by resistor 97 and capacitor 98. Thus again, the effective impedance seen by the "transmit" line 65, when looking in the direction of arrow 304, will be identical to that seen by the "receive" line 94, when looking in the direction of arrow 305, when no current is flowing in the "receive" line 94.

Because both the transistors associated with the optical isolator 41 and the transistors associated with the optical isolator 51 are always in an "on" condition when data is being transmitted from computer means 131 to computer means 11, the effective impedance seen by both the "transmit" line 65 and the "receive" line 94 will be the ground potential of the power supply 58 and ground 67. This will be true regardless of whether or not current is flowing in "receive" line 94. Thus the "transmit" line 65 and the "receive" line 94 will always see the same impedance when looking in the direction of arrows 301 and 302 when data is being transmitted from computer means 131 to computer means 11.

The use of optical isolator 51 makes it possible to balance the transmission line made up of the transmit line 65 and receive line 94 under all conditions. Because the transmission line is balanced, it is not possible to inject noise or other interference onto the line. Thus, errors due to such interference are eliminated. The method and apparatus of the present invention thus make it possible to utilize a two-wire unshielded twisted cable to "transmit" and "receive" information. Possible errors due to the injection of noise or interference, which are inherent in the use of a two-wire, unshielded, twisted-pair cable, are eliminated by the method and apparatus of the present invention for balancing a two-wire transmission line. It is thus possible to eliminate the high cost of using shielded cable by utilizing a two-wire unshielded transmission line together with the balancing method and apparatus of the present invention.

The invention has been described in terms of its presently preferred embodiment as is shown in the FIGURE. For the sake of convenience, some of the signals which supply power to the various chips shown in the schematic of the FIGURE have been omitted. Voltage levels required by various chips are specified by the manufacturers and are well known to those familiar with the art.

Many different circuit configurations are possible which would perform the functions required of the circuit shown in the FIGURE. The FIGURE is illustrative of a particular circuit configuration which will perform the required functions.

Specific components which are available commercially and which can be used in the practice of the invention as shown in the FIGURE follow. Values of resistors and capacitors used in these particular circuits are also given. Again, many different combinations of circuit values, particularly in the area of resistance and capacitance value are possible.

| | |
|---|---|
| Computer means 11 | Motorola 6800 Microprocessor Motorola |
| Computer means 131 | SC/MP Microprocessor, National Semiconductor |
| UAT 21 and UAR 22 | TR1402A, UART, Western Digital Corp. |
| Optical isolators 41,51,71,81 & 151 | HP5082-4371, Hewlett-Packard |
| NAND gates 25,171,182 & 232; OR gate 186 with inverted inputs | 74LS00, National Semiconductor |
| Tristate buffers 56,111 & 144 | 74LS367, National Semiconductor |
| Tristate inverters 112 & 142 | 9LS368, Fairchild Semiconductor |
| Diode 92 | IN 4001, National Semiconductor |
| Counter 202 | 74LS193, National Semiconductor |
| Counter 221 | 9LS193, Fairchild Semiconductor |
| Resistors 27,161,205,206,208 & 233 | 2.2 KΩ TRW/IRC, RN60D |
| Resistors 46,145 | 150 Ω TRW/IRC, RN60D |
| Resistors 63,76,95 & 164 | 47 Ω TRW/IRC, RN60D |
| Resistors 97 & 101 | 56 KΩ TRW/IRC, RN55D |
| Resistors 61,62,91 & 166 | 1 KΩ TRW/IRC, RN55D |
| Resistor 90 | 220 Ω TRW/IRC, RN60D |
| Capacitors 98 & 102 | .01 μf Sprague, HY-420 |

While the invention has been described in terms of the presently preferred embodiment, reasonable variations and modifications are possible by those skilled in the art, within the scope of the described invention and the appended claims.

That which is claimed is:

1. Apparatus comprising:
   a first optical isolation means having an input stage and an output stage;
   a transmission line means which is made up of a transmit line having first and second ends and a receive line having first and second ends, said transmit line and said receive line forming a current loop, the first end of said transmit line forming the input of said current loop and the first end of said receive line forming the output of said current loop, the second end of said transmit line being resistively connected to the second end of said receive line, the first end of said transmit line being electrically connected to the output stage of said first optical isolation means;
   means for supplying a first digital signal to the input stage of said first optical isolation means in such a manner that said first digital signal will be transmitted as the presence or absence of electrical current flow on said transmit line;
   a second optical isolation means having an input stage and an output stage;
   means for electrically connecting the first end of said receive line to the input stage of said second optical isolation means;
   a third optical isolation means having an input stage and an output stage, said third optical isolation means being in an on condition when said first optical isolation means is in an on condition and said third optical isolation means being in an off condition when said first optical isolation means is in an off condition;
   means for electrically connecting the input stage of said second optical isolation means to the output stage of said third optical isolation means in such a manner that the first end of said transmit line and the first end of said receive line are electrically balanced when electrical current is flowing in said transmit line, and the first end of said transmit line and the first end of said receive line are also electrically balanced when electrical current is not flowing in said transmit line.

2. Apparatus in accordance with claim 1 wherein said means for supplying said first digital signal to the input stage of said first optical isolation means is a universal asynchronous transmitter means.

3. Apparatus in accordance with claim 1 additionally comprising:
   a fourth optical isolation means having an input stage and an output stage;
   means for electrically connecting the second end of said transmit line to the output stage of said fourth optical isolation means;
   a fifth optical isolation means having an input stage and an output stage;
   means for electrically connecting the second end of said receive line to the input stage of said fifth optical isolation means;
   means for electrically connecting the output stage of said fourth optical isolation means to the input stage of said fifth optical isolation means in such a manner that said first digital signal will be output from the output stage of said fifth optical isolation means.

4. Apparatus in accordance with claim 3 additionally comprising means for supplying a second digital signal to the input stage of said fourth optical isolation means in such a manner that said second digital signal is transmitted over said receive line as the presence or absence of an electrical current flow on said receive line.

5. Apparatus comprising:
   a first optical isolation means having an input stage made up of a first light emitting diode, having an anode and a cathode, and having an output stage made up of a first phototransistor having a base, emitter and a collector, and a first driving transistor, having a base, emitter and a collector, the emitter of said first phototransistor being electrically connected to the base of said first driving transistor;
   a transmission line means which is made up of a transmit line having first and second ends and a receive line having first and second ends, said transmit line and said receive line forming a current loop, the first end of said transmit line forming the input of said current loop and the first end of said receive line forming the output of said current loop, the second end of said transmit line and the second end of said receive line being resistively connected, the first end of said transmit line being electrically connected to the emitter of said first driving transistor associated with said first optical isolation means;

means for supplying a first digital signal to the input stage of said first optical isolation means in such a manner that current flows from the anode side of said first light emitting diode to the cathode side of said first light emitting diode causing light to be emitted by said first light emitting diode, the light being emitted by said first light emitting diode being sensed by said first phototransistor in such a manner that said first phototransistor is turned on and said first driving transistor is also turned on;

a power supply means;

means for electrically connecting said power supply means to the collector of said driving transistor in such a manner that when said first driving transistor is turned on in response to light being emitted from said first light emitting diode, said first digital signal will be transmitted as the presence or absence of electrical current flow on said transmit line;

a second optical isolation means having an input stage made up of a second light emitting diode, having an anode and a cathode, and having an output stage made up of a second phototransistor, having a base, emitter and collector, and a second driving transistor, having a base, emitter and collector, the emitter of said second phototransistor being electrically connected to the base of said second driving transistor;

means for electrically connecting the first end of said receive line to the anode side of said second light emitting diode which forms the input stage of said second optical isolation means;

a third optical isolation means having an input stage made up of a third light emitting diode, having an anode and a cathode, and having an output stage made up of a third phototransistor, having a base, emitter and collector, and a third driving transistor, having a base, emitter, and collector, the emitter of said third phototransistor being electrically connected to the base of said third driving transistor, said third optical isolation means being in an on condition when said first optical isolation means is in an on condition, and said third optical isolation means being in an off condition when said first optical isolation means is in an off condition;

means for electrically connecting the cathode side of said second light emitting diode, which forms the input stage of said second optical isolation means, to the collector of said third driving transistor, associated with said third optical isolation means, in such a manner that the first end of said transmit line and the first end of said receive line are electrically balanced when electrical current is flowing in said transmit line and the first end of said transmit line and the first end of said receive line are also electrically balanced when electrical current is not flowing in said transmit line.

6. Apparatus in accordance with claim 5 wherein said means for supplying said first digital signal to the input stage of said first optical isolation means comprises a universal asynchronous transmitter means.

7. Apparatus in accordance with claim 5 additionally comprising:

a fourth optical isolation means having an input stage made up of a fourth light emitting diode, having an anode and a cathode, and having an output stage made up of a fourth phototransistor, having a base, emitter, and collector, and a fourth driving transistor, having a base, emitter, and collector, the emitter of said fourth phototransistor being electrically connected to the base of said fourth driving transistor, said fourth optical isolation means being always in an on condition when said first digital signal is being transmitted;

means for electrically connecting the second end of said transmit line to the collector of said fourth driving transistor associated with said fourth optical isolation means;

a fifth optical isolation means having an input stage made up of a fifth light emitting diode, having an anode and a cathode, and having an output stage made up of a fifth phototransistor, having a base, emitter, and collector, and a fifth driving transistor, having a base, emitter, and collector, the emitter of said fifth phototransistor being electrically connected to the base of said fifth driving transistor;

means for electrically connecting the emitter of said fourth driving transistor, associated with said fourth optical isolation means, to the anode side of said fifth light emitting diode, which forms the input stage of said fifth optical isolation means, in such a manner that the presence of an electrical current flow on said transmit line will result in an electrical current flow from the anode side of said fifth light emitting diode to the cathode side of said fifth light emitting diode, and the absence of electrical current flow on said transmit line will result in the absence of any electrical current flow from the anode side of said fifth light emitting diode to the cathode side of said fifth light emitting diode;

a second power supply means;

means for electrically connecting said second power supply means to the collector of said fifth driving transistor, associated with said fifth optical isolation means, in such a manner that a first voltage signal, representative of the presence of electrical current flow on said transmit line, is generated in response to light being emitted by said fifth light emitting diode and a second voltage signal, representative of the absence of electrical current flow on said transmit line, is generated in response to the absence of light emitted from said fifth light emitting diode.

8. Apparatus in accordance with claim 7 additionally comprising means for supplying a second digital signal to the input stage of said fourth optical isolation means in such a manner that said second digital signal is transmitted over said receive line as the presence or absence of an electrical current flow.

9. A method for balancing a transmission line means which is made up of a transmit line having first and second ends and a receive line having first and second ends, said transmit line and said receive line forming a current loop, the first end of said transmit line forming the input of said current loop and the first end of said receive line forming the output of said current loop, the second end of said transmit line being resistively connected to the second end of said receive line, comprising the steps of:

providing an electrical path to ground for the first end of said transmit line when an electrical current flow is established on said transmit line and also providing an electrical path to ground for the first end of said receive line when an electrical current flow is established on said transmit line in such a manner that the first end of said transmit line and the first end of said receive line see the same impedance when an electrical current flow is established on said transmit line and thus the first end of said transmit line and the first end of said receive line are electrically balanced when an electrical current flow is established on said transmit line; and providing an electrical path through a resistive element for the first end of said transmit line when no electrical current is flowing in said transmit line and also providing an electrical path through said resistive element for the first end of said receive line when no electrical current is flowing in said transmit line in such a manner that the first end of said transmit line and the first end of said receive line are electrically balanced when no electrical current flow is established on said transmit line.

* * * * *